United States Patent
Trappier et al.

(10) Patent No.: US 11,525,367 B2
(45) Date of Patent: Dec. 13, 2022

(54) SEALING BETWEEN A ROTOR DISC AND A STATOR OF A TURBOMACHINE

(71) Applicant: SAFRAN AIRCRAFT ENGINES, Paris (FR)

(72) Inventors: Nicolas Xavier Trappier, Moissy-Cramayel (FR); Joao Antonio Amorim, Moissy-Cramayel (FR); Maxime Aurelien Rotenberg, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 29 days.

(21) Appl. No.: 17/291,503

(22) PCT Filed: Nov. 6, 2019

(86) PCT No.: PCT/FR2019/052635
§ 371 (c)(1),
(2) Date: May 5, 2021

(87) PCT Pub. No.: WO2020/099762
PCT Pub. Date: May 22, 2020

(65) Prior Publication Data
US 2022/0003127 A1 Jan. 6, 2022

(30) Foreign Application Priority Data
Nov. 16, 2018 (FR) ...................... 1860586

(51) Int. Cl.
*F01D 11/12* (2006.01)
*F01D 9/04* (2006.01)
*F01D 11/00* (2006.01)

(52) U.S. Cl.
CPC ............ *F01D 11/122* (2013.01); *F01D 9/041* (2013.01); *F01D 11/001* (2013.01);
(Continued)

(58) Field of Classification Search
CPC ........ F01D 11/08; F01D 11/12; F01D 11/122; F01D 11/127; F01D 11/001; F01D 11/02;
(Continued)

(56) References Cited

U.S. PATENT DOCUMENTS

2013/0004290 A1* 1/2013 Krishnan ............... F01D 11/127
  415/208.1
2014/0064909 A1* 3/2014 Trivedi ................... F01D 11/02
  415/173.5
(Continued)

FOREIGN PATENT DOCUMENTS

| EP | 3023595 A1 | 5/2016 |
| FR | 2977274 A1 | 1/2013 |
| WO | 2015/092281 A1 | 6/2015 |

OTHER PUBLICATIONS

International Search Report received for PCT Patent Application No. PCT/FR2019/052635, dated Mar. 11, 2020 5 pages (2 pages of English Translation and 3 pages of Original Document).

*Primary Examiner* — Eldon T Brockman
*Assistant Examiner* — Elton K Wong
(74) *Attorney, Agent, or Firm* — Womble Bond Dickinson (US) LLP

(57) ABSTRACT

Assembly including a rotor disc, an adjacent stator and a plurality of sealing elements secured to the rotor disc, the stator including an inner platform and a root bearing at least one abradable element configured to cooperate with the sealing elements, the sealing elements being placed in an enclosure formed by the abradable element, the enclosure being open to the inside and delimited axially by an upstream abradable edge and a downstream abradable edge, the enclosure being delimited radially by an outer abradable edge, at least one of the sealing elements including a first lip configured to cooperate with the upstream abradable edge or
(Continued)

the downstream abradable edge, and a second, separate lip configured to cooperate with the outer abradable edge.

13 Claims, 3 Drawing Sheets

(52) U.S. Cl.
CPC ...... *F05D 2240/11* (2013.01); *F05D 2240/12* (2013.01); *F05D 2240/55* (2013.01)

(58) Field of Classification Search
CPC ... F01D 9/02; F01D 9/04; F01D 9/041; F05D 2240/11; F05D 2240/12; F05D 2240/55; F16C 33/80; F16J 15/447; F16J 15/4472
See application file for complete search history.

(56) References Cited

U.S. PATENT DOCUMENTS

| | | | |
|---|---|---|---|
| 2017/0130601 A1* | 5/2017 | Coutandin | F01D 11/001 |
| 2018/0163740 A1* | 6/2018 | Scholtes | F02C 7/28 |
| 2018/0209290 A1* | 7/2018 | Port | F04D 29/083 |

* cited by examiner

SEALING BETWEEN A ROTOR DISC AND A STATOR OF A TURBOMACHINE

TECHNICAL FIELD

The present invention relates to the field of turbomachines such as a turbojet engine or a turboprop engine of an aircraft, and more particularly to the sealing between a mobile wheel and an adjacent bladed turbine stator of a turbine of such a turbomachine.

BACKGROUND

Traditionally, a turbomachine turbine comprises various stages each comprising a mobile wheel whose axis of rotation X (or engine axis) is coaxial with the longitudinal axis of the turbomachine and an axially adjacent bladed turbine stator. The mobile wheel comprises a plurality of mobile vanes each comprising a blade that extends radially between a radially inner platform and a radially outer platform, and a root that extends radially below the inner platform. In addition, radially outwardly, each mobile vane comprises a stub that extends from the radially outer platform of the mobile vane. The bladed turbine stator comprises a plurality of fixed blades each extending radially between an inner platform and an outer platform. In the turbomachine, the inner and outer platforms of the mobile wheels and bladed turbine stators delimit a gas flow channel known as the primary duct of the turbomachine.

By convention in the present application, "axial" or "axially" means any direction parallel to the axis X, and "radial" or "radially" means any direction perpendicular to the axis X. Similarly, by convention in the present application, the terms "inner", "outer", "inside" and "outside" are defined radially with respect to the axis X. Finally, the terms "upstream" and "downstream" are defined with respect to the direction of gas flow in the primary duct of the turbomachine.

The root of each mobile vane is mounted in a complementary shaped pocket in a disc of the mobile wheel. The mobile wheels of the different stages are generally flanged together. The mobile wheels and the inner platforms of the bladed turbine stators define radially between them different cavities (also called bypass paths) outside the duct.

In order to limit the gas flow through these cavities, and in other words to maximise the quantity of gas passing through the blades of the bladed turbine stators, the document FR-A1-2977274 in the name of the applicant proposes that the inner platform of the bladed turbine stator comprises a root on which at least one abradable element is fixed, this abradable element being capable of cooperating with at least one lip secured to the mobile wheel, to form a labyrinth-type seal.

The objective of the present invention is therefore to propose a sealing device that effectively reduces the gas flows in the cavities located at the level of a root of a bladed turbine stator, while limiting the mass and size.

The prior art also comprises documents WO-A1-2015/092281 and EP-A1-3023595.

DESCRIPTION OF THE INVENTION

The invention proposes an assembly for a turbomachine comprising a first mobile wheel extending around an axis X and an adjacent bladed turbine stator, said bladed turbine stator being coaxial with said axis X and axially offset from said first mobile wheel, said assembly comprising a plurality of sealing elements, each sealing element being secured to said first mobile wheel and projecting radially from said first mobile wheel, said bladed turbine stator comprising an inner platform intended to delimit a gas flow channel in the turbomachine and a root extending radially below the inner platform, said root bearing at a radially inner end at least one abradable element configured to cooperate with the sealing elements, characterised in that said sealing elements are placed in an enclosure formed by said at least one abradable element, said enclosure being open inwards and delimited axially by an upstream abradable edge and a downstream abradable edge, said enclosure being radially delimited by an outer abradable edge, and in that at least one of the sealing elements comprises a first lip configured to cooperate with the upstream abradable edge or the downstream abradable edge, and a second lip separate from the first lip and configured to cooperate with the outer abradable edge.

By "abradable edge" is meant an edge made of an abradable material, for example a material having a honeycomb structure.

Firstly, such sealing elements are configured to cooperate with the upstream, downstream and outer abradable edges of the enclosure, so as to stop the gas flow entering the cavity during the various operating phases of the turbomachine, and in other words to maximise the quantity of gas passing through the blades of the bladed turbine stator during the various operating phases of the turbomachine.

Secondly, such a sealing arrangement has a limited mass and size requirement.

The assembly according to the invention may comprise one or more of the following characteristics, taken in isolation from each other or in combination with each other:

- an upstream sealing element comprises an axial lip extending upstream, said axial lip of said upstream sealing element being configured to cooperate with said upstream abradable edge;
- a downstream sealing element comprises an axial lip extending downstream, said axial lip of said downstream sealing element being configured to cooperate with said downstream abradable edge;
- each of the sealing elements comprises a radial lip extending outwardly, each of the radial lips being configured to cooperate with the outer abradable edge of the enclosure formed by the at least one abradable element;
- said at least one abradable element is radially staged and comprises a first cylindrical surface surrounding an upstream sealing element and a second cylindrical surface surrounding a downstream sealing element;
- said first cylindrical surface has a larger diameter than said second cylindrical surface;
- said first mobile wheel comprises a disc to which mobile vanes are fitted, said disc comprising a flange extending axially, said sealing elements being fitted to said flange or integrally formed with said flange;
- said assembly comprises a second mobile wheel adjacent to said bladed turbine stator so that said bladed turbine stator is axially arranged between said first mobile wheel and said second mobile wheel, said assembly comprising a shroud flanged between said first mobile wheel and said second mobile wheel, the sealing elements being fitted to said shroud or integrally formed with said shroud;
- said upstream and downstream abradable edges of the enclosure formed by the at least one abradable element are fitted to said root of said inner platform;

a first abradable element comprises said upstream abradable edge and a second abradable element comprises said downstream abradable edge;

the root comprises an upstream abradable member arranged axially upstream of the root, said upstream abradable member being adapted to cooperate with a spoiler of a mobile vane of the first mobile wheel;

the root comprises a downstream abradable member arranged axially downstream of the root, said downstream abradable member being adapted to cooperate with a spoiler of a shroud flanged between said first mobile wheel and a second mobile wheel adjacent to said bladed turbine stator.

A second object of the invention is a turbomachine comprising a turbine comprising an assembly as described above.

DESCRIPTION OF FIGURES

The invention will be better understood and other details, characteristics and advantages of the invention will become clearer from the following description made by way of non-limiting example and with reference to the attached drawings in which.

DETAILED DESCRIPTION

Figure 1:
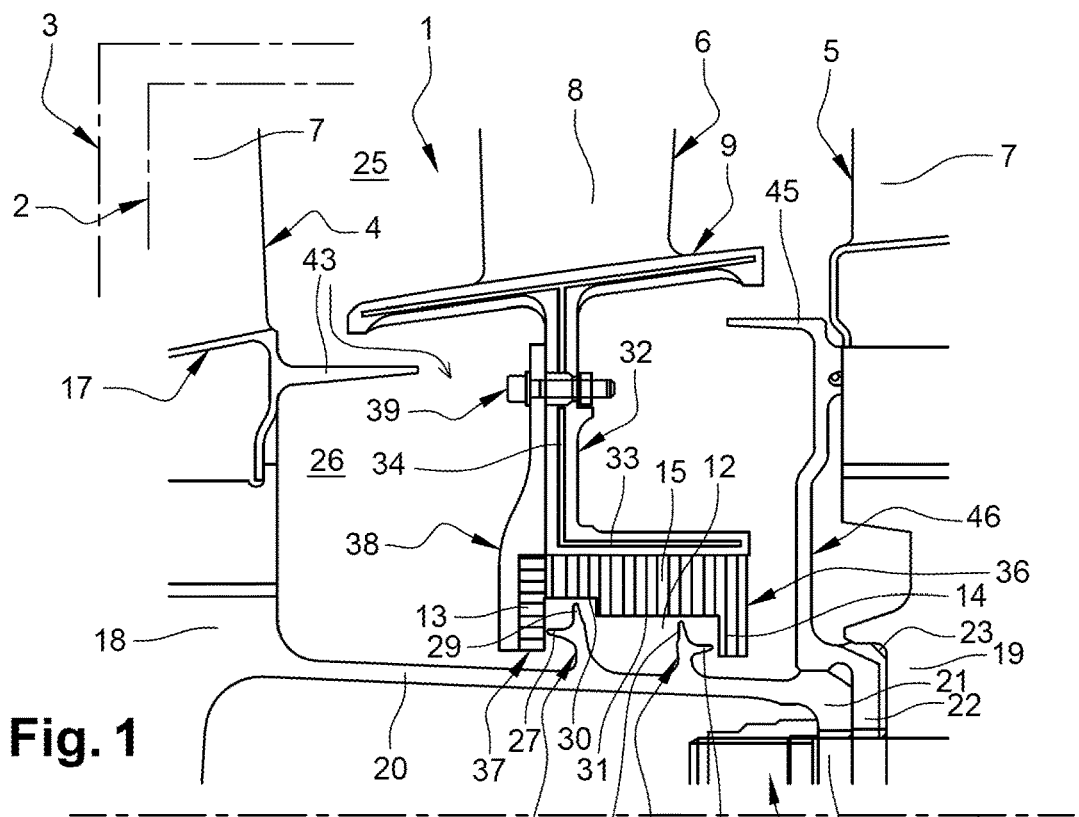
FIG. 1 is a partial axial half-section view of a turbine of a turbomachine illustrating an assembly comprising a mobile wheel and a bladed turbine stator, according to a first embodiment.

FIGS. 1 to 5 show an assembly 1 of a low pressure turbine 2 of a turbomachine 3, such as a turbojet engine or a turboprop engine of an aircraft. The low pressure turbine 2 is arranged downstream of a high pressure turbine which is itself arranged downstream of a combustion chamber, with respect to the direction of gas flow in the turbomachine 3.

The embodiments illustrated in FIGS. 1 to 5 are by no means limiting, as the assembly described could be arranged in a high-pressure turbine in particular.

The assembly 1 comprises a mobile wheel 4, 5 which extends around an axis X and an axially adjacent bladed turbine stator 6. The bladed turbine stator 6 is coaxial with the axis X and axially offset from the mobile wheel 4, 5. The assembly 1 comprises a plurality of sealing elements 10, 11. Each sealing element 10, 11 is secured to the mobile wheel and projects radially from the mobile wheel 4, 5. The bladed turbine stator 6 comprises an inner platform 9 intended to delimit a gas flow channel 25 in the turbomachine 3 and a root 32 extending radially below the inner platform 9. The root 32 bears at a radially inner end at least one abradable element 36, 37, 47, 48 configured to cooperate with the sealing elements 10, 11. The sealing elements 10, 11 are placed in an enclosure 12 formed by the at least one abradable element 36, 37, 47, 48. The enclosure 12 is open inwards and delimited axially by an upstream abradable edge 13 and a downstream abradable edge 14. The enclosure 12 is radially delimited by an outer abradable edge 15. At least one of the sealing elements 10, 11 comprises a first lip 27, 28 configured to cooperate with the upstream abradable edge 13 or the downstream abradable edge 14, and a second lip 29 separate from the first lip 27, 28 and configured to cooperate with the outer abradable edge 15.

As required, the first lip may be axial (i.e. extending in a direction parallel to the axis X) or inwardly inclined (with respect to the axis X) or outwardly inclined (with respect to the axis X).

As required, the second lip may be radial (i.e. extending in a direction perpendicular to the axis X) or inclined upstream (with respect to the perpendicular to the axis X) or inclined downstream (with respect to the perpendicular to the axis X).

At least one of the sealing elements comprises a first lip and a second lip, the other sealing elements may each comprise for example a first lip and/or a second lip.

More specifically, according to the embodiments illustrated in the figures, the assembly 1 comprises a bladed turbine stator 6 placed between an upstream mobile wheel 4 and a downstream mobile wheel 5 flanged to each other via a plurality of bolts 16. The upstream and downstream mobile wheels 4, 5 form the rotor of the low-pressure turbine 2 and the bladed turbine stator 6 forms the stator of the low-pressure turbine 2. The bladed turbine stator 6 and the downstream mobile wheel 5 form a sub-assembly more commonly referred to as a "stage" of the low pressure turbine 2.

The bladed turbine stator 6 comprises a plurality of fixed blades 8 evenly distributed around the axis X. The fixed blades 8 of the bladed turbine stator 6 are radially delimited by the inner platform 9 and an outer platform (not shown). The outer platform comprises means for attachment to an outer casing of the low pressure turbine 2. The bladed turbine stator 6 may be sectorised and comprise a plurality of sectors arranged circumferentially end to end about the axis X.

The mobile wheels 4, 5 each comprise a plurality of mobile vanes 7 evenly distributed around the axis X. The mobile vanes 7 are each radially delimited by a radially inner platform 17 of a root, the root extending radially below the radially inner platform 17, and a radially outer platform of a stub (not shown). The mobile vanes 7 of a mobile wheel 4, 5 are fitted into pockets made in a disc 18, 19.

The disc 18 of the upstream mobile wheel 4 comprises a downstream flange 20 axially delimited by a downstream end 21. The downstream flange 20 extends between the upstream mobile wheel 4 and the downstream mobile wheel 5. The downstream flange 20 is integrally formed with the disc 18 of the upstream mobile wheel 4. The downstream end 21 of the downstream flange 20 is centered and supported on a flange 22 of an annular shroud 46. The flange 22 of the shroud 46 is centered and supported on a recess 23 made in the disc 19 of the downstream mobile wheel 5. The positioning of the downstream end 21 of the downstream flange 20 with respect to the flange 22 of the shroud 46 (via a support surface and a centering surface) is formed by a planar support connection and a short centering. Such a positioning is also used to position the flange 22 of the shroud 46 with respect to the recess 23 of the disc 19 of the downstream mobile wheel 5. The downstream end 21 of the downstream flange 20 and the flange 22 of the shroud 46 are attached to the disc 19 of the downstream mobile wheel 5 via a plurality of bolts 16. The screw 24 of each of the bolts 16 simultaneously passes through a through hole made in the downstream end 21 of the downstream flange 20, a through hole made in the flange 22 of the shroud 46 and a through hole made in the disc 19 of the downstream mobile wheel 5.

The shroud 46 is supported against the mobile vanes 7 of the downstream mobile wheel 5.

The inner and outer platforms of the mobile wheel and the inner and outer platforms of the bladed turbine stators delimit a gas flow channel 25 (commonly referred to as the primary duct) through which exhaust gases flow.

The discs 18, 19 of the mobile wheels 4, 5 and the inner platform 9 of the bladed turbine stator 6 define radially between them an inner cavity 26 located radially below the channel 25.

A minor gas flow (represented in each of the figures by an arrow) can enter the cavity 26 and flow downstream, due to the pressure difference between the upstream and the downstream of the bladed turbine stator 6. The sealing elements 10, 11 are configured to cooperate with the upstream, downstream and outer abradable edges 13-15 of the enclosure 12, so as to stop the gas flow entering the cavity 26 during the different operating phases of the turbomachine, and in other words to maximise the quantity of gas processed by the bladed turbine stator 6 during the different operating phases of the turbomachine. Such sealing also minimises the thermal impact on the rotor.

According to the embodiments illustrated in the figures, the assembly 1 comprises an upstream sealing element 10 and a downstream sealing element 11 axially separated from each other.

The embodiments illustrated in FIGS. 1 to 5 are by no means limiting, and the assembly described could comprise, for example, a third sealing element positioned between the upstream sealing element 10 and the downstream sealing element 11.

According to the embodiments illustrated in the figures, the upstream sealing element 10 comprises an axial lip 27 extending upstream. The axial lip 27 of the upstream sealing element 10 is configured to cooperate with the upstream abradable edge 13.

More specifically, the axial lip 27 projects axially from a free end of the upstream sealing element 10. The axial lip 27 is positioned directly opposite the upstream abradable edge 13. The axial lip 27 is mounted with an axial clearance with respect to the upstream abradable edge 13. The axial lip 27 will be in particular in axial contact with the upstream abradable edge 13 when the turbomachine is in cruise phase, so as to stop the gas flow entering the cavity 26. The axial contact is ensured via the relative axial displacements between the mobile wheels 4, 5 and the bladed turbine stator 6, when the turbomachine is in operation.

The downstream sealing element 11 comprises an axial lip 28 extending downstream. The axial lip 28 of the downstream sealing element 11 is configured to cooperate with the downstream abradable edge 14.

More specifically, the axial lip 28 projects axially from a free end of the downstream sealing element 11. The axial lip 28 is positioned directly opposite the downstream abradable edge 14. The axial lip 28 is mounted with an axial clearance relative to the downstream abradable edge 14. The axial lip 28 will be in particular in axial contact with the downstream abradable edge 14 when the turbomachine is in the start-up phase, so as to stop the gas flow entering the cavity 26. The axial contact is ensured via the relative axial displacements between the mobile wheels 4, 5 and the bladed turbine stator 6, when the turbomachine is in operation.

According to the embodiments illustrated in the figures, each of the upstream and downstream sealing elements 10, 11 comprises a radial lip 29 extending outwardly, each of the radial lips 29 being configured to cooperate with the outer abradable edge 15 radially delimiting the enclosure 12.

More specifically, each radial lip 29 projects radially from a free end of the corresponding sealing element 10, 11. Each radial lip 29 is positioned directly opposite the outer abradable edge 15. Each radial lip 29 is mounted with a radial clearance relative to the outer abradable edge 15. In particular, the radial lips 29 will be in radial contact with the outer abradable edge 15 when the turbomachine is in the transitional phase between the start-up phase and the cruising phase (until the axial movements of the mobile wheels 4, 5 and of the bladed turbine stator 6 are stabilised), so as to stop the gas flow entering the cavity 26. The radial contact is ensured by ventilating the outer casing of the low pressure turbine 2 with a cold air flow via a ventilation device, better known by the acronym LPTACC for "Low Pressure Turbine Active Control Clearance". Such a LPTACC ventilation system typically comprises a scoop for taking in a cold air flow, and a circuit designed to distribute and project the cold air taken in on an outer face of the outer casing of the low pressure turbine 2. The LPTACC ventilation device allows the temperature of the outer casing to be regulated, and consequently the radial clearances between the radial lips 29 and the outer abradable edge 15.

As explained above, the axial lips 27, 28 guarantee the sealing between the bladed turbine stator 6 (more precisely the root 32) and the rotor during the start-up phase and most of the cruising phase. Thus, during the various operating phases mentioned above, it is possible to deactivate the LPTACC ventilation system, to the benefit of the efficiency of the turbomachine. As explained above, the ventilation system is activated in the transient phase between the start-up phase and the cruise phase.

According to the embodiments illustrated in the figures, the outer abradable edge 15 is staged, the outer abradable edge 15 comprises a first cylindrical surface 30 surrounding the upstream sealing element 10 and a second cylindrical surface 31 surrounding the downstream sealing element 11.

According to the first and second embodiments illustrated in FIGS. 1 to 4, the first cylindrical surface 30 has a larger diameter than the second cylindrical surface 31.

Figure 5:
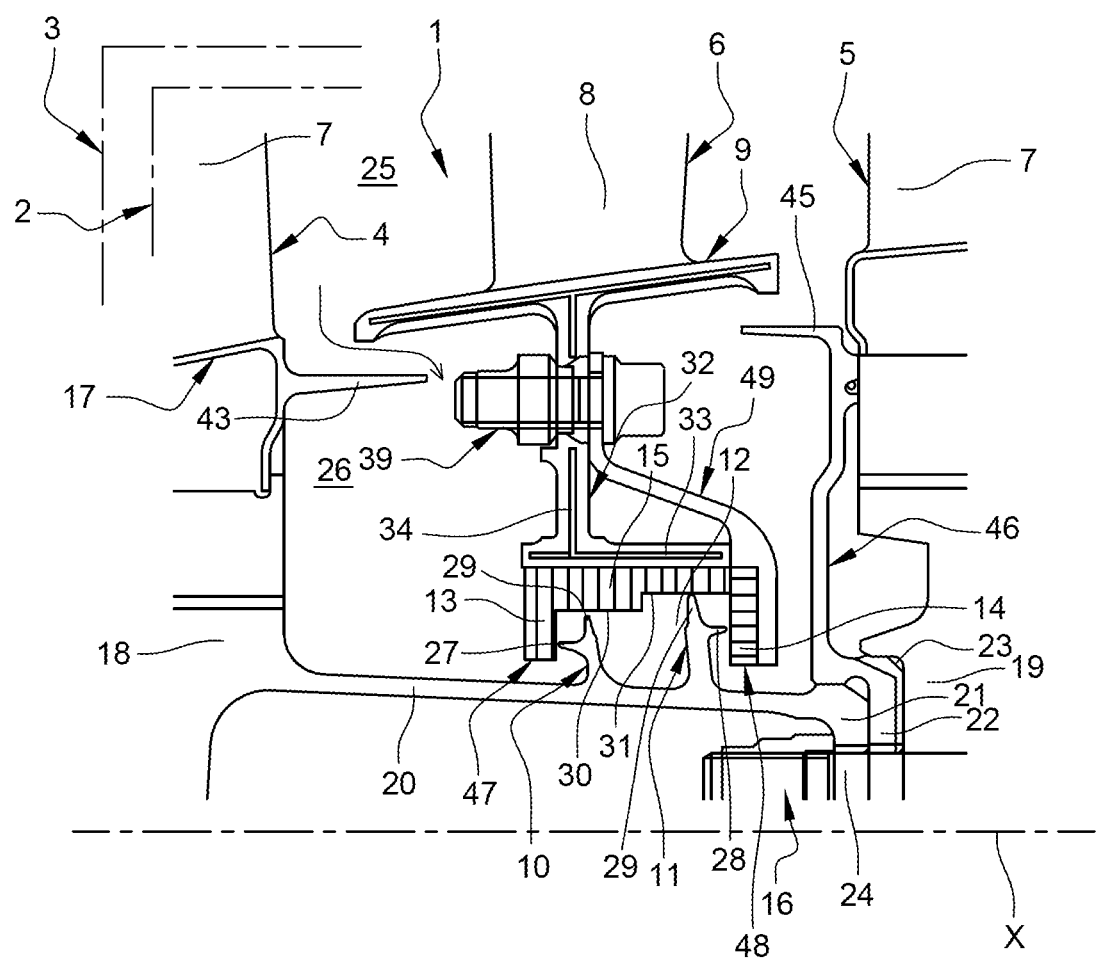
FIG. 5 is a partial axial half-section view of a turbine of a turbomachine illustrating an assembly comprising a mobile wheel and a bladed turbine stator, according to a third embodiment.

According to the third embodiment illustrated in FIG. 5, the second cylindrical surface 31 has a larger diameter than the first cylindrical surface 30.

According to the embodiments illustrated in the figures, the upstream, downstream and outer abradable edges 13-15 are fitted to the root 32 of the bladed turbine stator 6. The root 32 comprises an axial wall 33 and a radial wall 34 connecting the axial wall 33 to the inner platform 9.

More specifically, the inner platform 9 is frustoconical and flares from upstream to downstream. The root 32 has an "L"-shaped profile in cross-section. The axial wall 33 extends downstream from an inner end of the radial wall 34. Here, the root 32 is integrally formed with the inner platform 9.

According to the first and second embodiments illustrated in FIGS. 1 to 4, the outer and downstream abradable edges 14, 15 form a first abradable element 36 fitted directly to an inner face of the axial wall 33 of the root 32. The upstream abradable edge 13 forms a second abradable element 37 fitted to an upstream ring 38 which is itself fitted to the radial wall 34 of the root 32. The enclosure 12 is thus formed by the first and second abradable elements 36, 37.

More precisely, the upstream ring 38 is attached to the radial wall 34 via bolts 39, the screw of each of the bolts 39 simultaneously passing through a through hole made in the upstream ring 38 and a through hole made in the radial wall 34. The upstream ring 38 may be sectorised.

According to a first alternative embodiment, the first abradable element could be indirectly fitted to the root. By "indirectly fitted" is meant the fact of fitting the first abradable element to the root via at least one intermediate part.

According to a second alternative embodiment, the outer and downstream abradable edges could form two distinct abradable elements fitted directly or indirectly to the root.

According to a third alternative embodiment, the axial wall could extend upstream from an inner end of the radial wall. The outer and upstream abradable edges could form a first abradable element fitted, directly or indirectly, to the root. The downstream abradable edge could form a second abradable element fitted, directly or indirectly, to the root.

According to the third embodiment illustrated in FIG. 5, the upstream and outer abradable edges 13, 15 form a first abradable element 47 fitted directly to an inner face of the axial wall 33 of the root 32. The downstream abradable edge 14 forms a second abradable element 48 fitted to a downstream ring 49 which is itself fitted to the radial wall 34 of the root 32. The enclosure 12 is thus formed by the first and second abradable elements 47, 48.

More precisely, the downstream ring 49 is attached to the radial wall 34 via bolts 39, the screw of each of the bolts 39 simultaneously passing through a through hole made in the downstream ring 49 and a through hole made in the radial wall 34. The downstream ring 49 may be sectorised.

Figure 2:
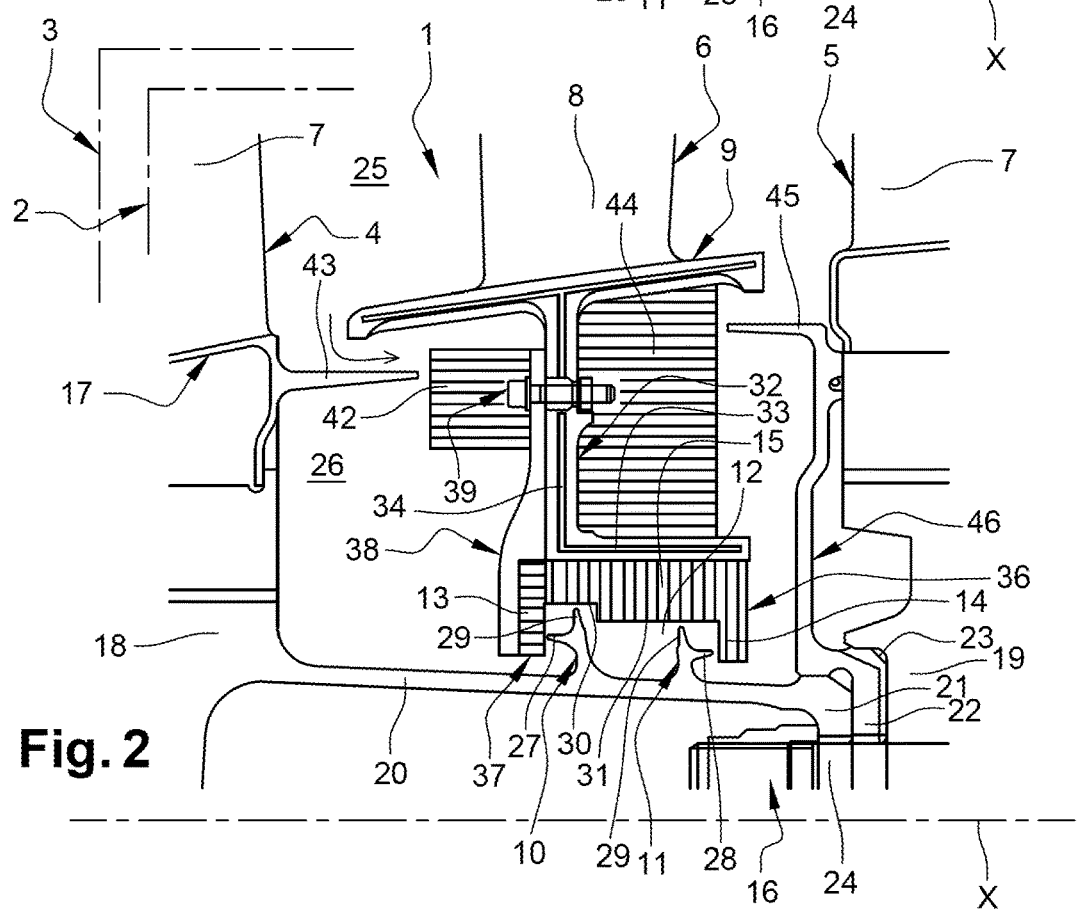
FIG. 2 is a partial axial half-section view illustrating an alternative of the first embodiment.

According to the first and third embodiments shown in FIGS. 1, 2 and 5, the upstream and downstream sealing elements 10, 11 are integrally formed with the downstream flange 20. The upstream and downstream sealing elements 10, 11 project radially outwards from the downstream flange 20.

Alternatively, the upstream and downstream sealing elements could be fitted directly or indirectly to the downstream flange.

According to an embodiment not shown in the figures, the downstream flange could be linked to the disc of the downstream mobile wheel, and not to the disc of the upstream mobile wheel. The downstream flange would then, for example, be integrally formed with the disc of the downstream mobile wheel. The downstream end of the downstream flange would then be positioned and held in position, directly or indirectly (e.g. via a shroud), relative to the disc of the upstream mobile wheel.

Figure 3:
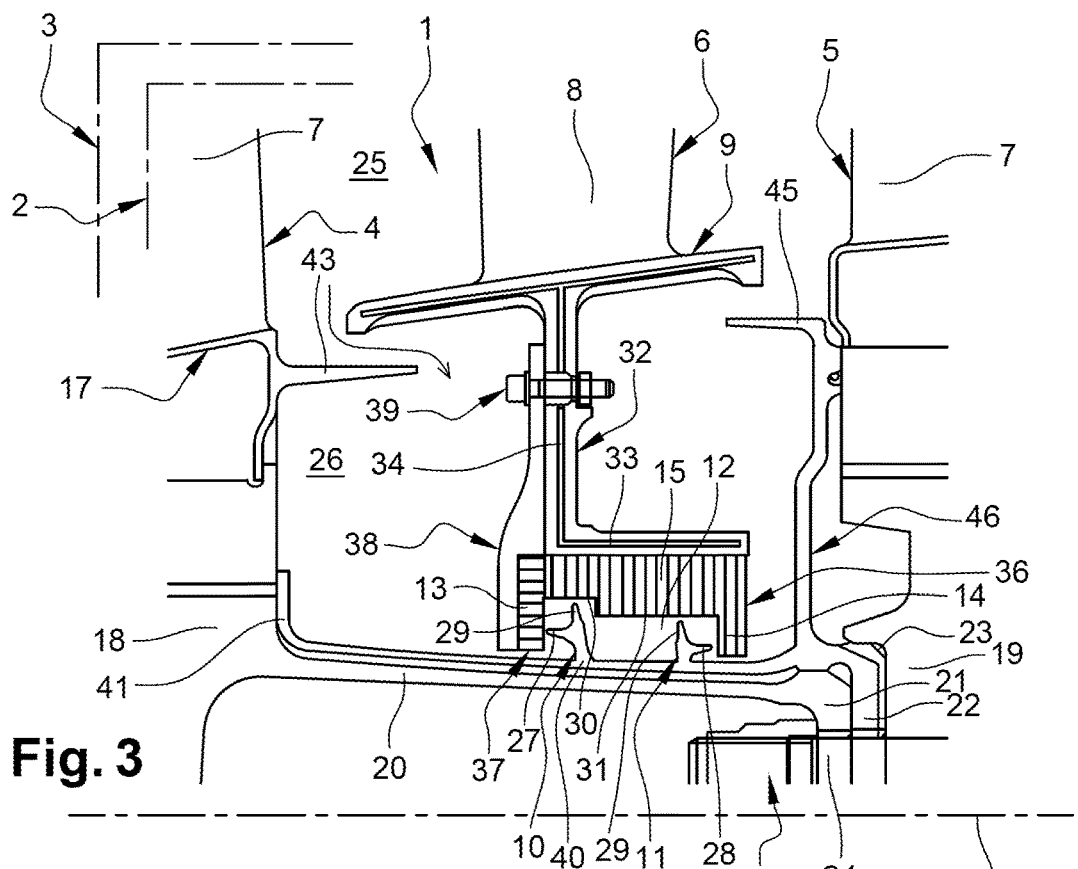
FIG. 3 is a partial axial half-section view of a turbine of a turbomachine illustrating an assembly comprising a mobile wheel and a bladed turbine stator, according to a second embodiment.
Figure 4:
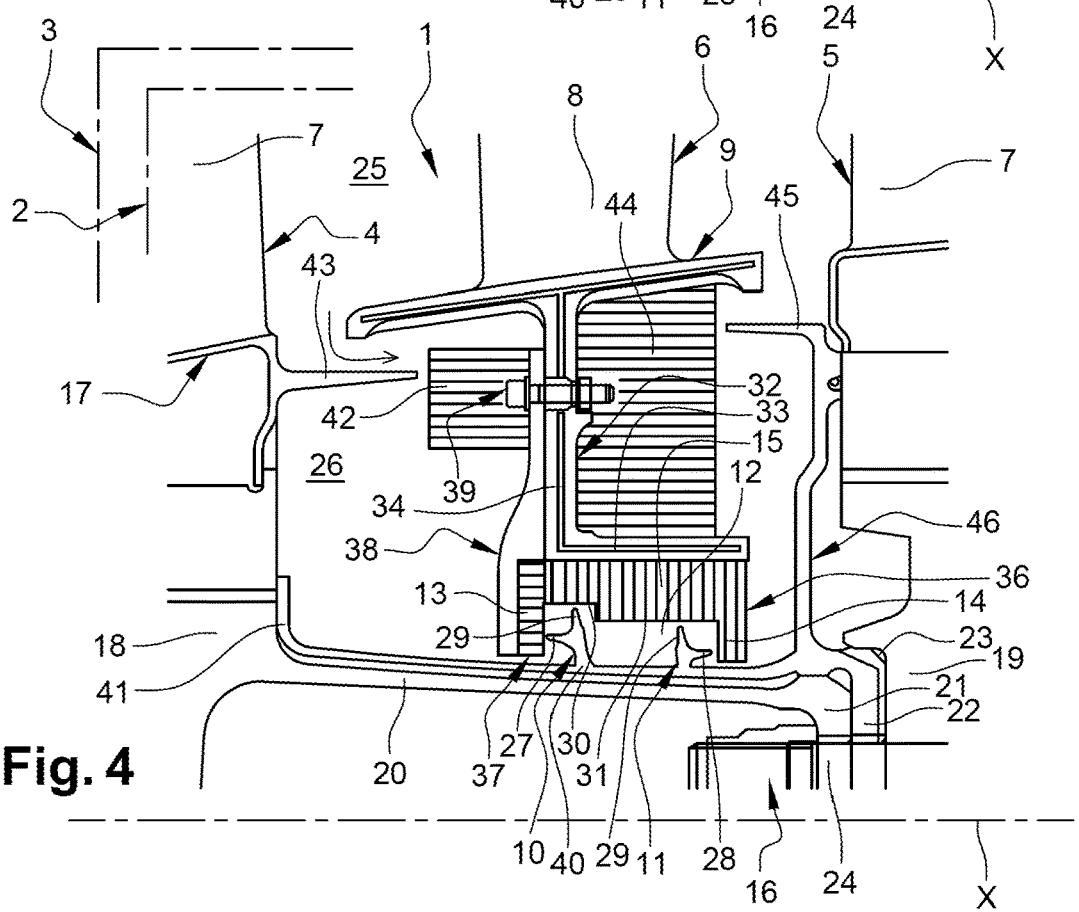
FIG. 4 is a partial axial half-section view illustrating an alternative of the second embodiment.

According to the second embodiment illustrated in FIGS. 3 and 4, the upstream and downstream sealing elements 10, 11 are integrally formed with the shroud 46.

More specifically, the upstream and downstream sealing elements 10, 11 are integrally formed with a sealing wall 40 of the shroud 46, the sealing wall 40 surrounding the downstream flange 20. Here, the sealing wall 40 is integrally formed with the shroud 46. The upstream and downstream sealing elements 10, 11 project radially outwardly from the sealing wall 40. The sealing wall 40 has an upstream end 41 which extends radially abutting the disc 18 of the upstream mobile wheel 4.

Alternatively, the upstream and downstream sealing elements could be fitted directly or indirectly to the sealing wall of the shroud.

According to the alternative embodiments of the first and second embodiments illustrated in FIGS. 2 and 4, the assembly 1 comprises an upstream abradable member 42 arranged axially upstream of the radial wall 34. The upstream abradable member 42 is adapted to cooperate with spoilers 43 of the mobile vanes 7 of the upstream mobile wheel 4.

More precisely, the upstream abradable member 42 is mounted directly on the upstream ring 38. Alternatively, the upstream abradable member 42 could be mounted on the upstream ring 38 or the root 32 via an intermediate element. The upstream abradable member 42 is positioned directly opposite the downstream spoilers 43 of the inner platforms 17 of the mobile vanes 7 of the upstream mobile wheel 4. The upstream abradable member 42 is mounted with an axial clearance with respect to the downstream spoilers 43. The downstream spoilers 43 will be in particular in axial contact with the upstream abradable member 42 when the turbomachine is in the start-up phase, so as to stop the gas flow entering the cavity 26. The axial contact is ensured via the relative axial displacements between the mobile wheels 4, 5 and the bladed turbine stator 6, when the turbomachine is in operation.

The sealing performed via the downstream spoilers 43 and the upstream abradable member 42 is here in addition to the sealing performed via the upstream and downstream sealing elements 10, 11.

Alternatively, the upstream abradable member could be able to cooperate with an axial collar of an annular shroud flanged between the upstream mobile wheel and the downstream mobile wheel, for example at the level of the disc of the upstream mobile wheel.

According to the alternative embodiments of the first and second embodiments illustrated in FIGS. 2 and 4, the assembly 1 further comprises a downstream abradable member 44 arranged axially downstream of the radial wall 34. The downstream abradable member 44 is adapted to cooperate with an axial collar 45 of the annular shroud 46 flanged between the upstream mobile wheel 4 and the downstream mobile wheel 5.

More precisely, the axial collar 45 projects axially upstream from an outer end of the shroud 46. The downstream abradable member 44 is mounted directly on the downstream face of the radial wall 34. Alternatively, the downstream abradable member 44 could be mounted on the root 32 via an intermediate element. The downstream abradable member 44 is positioned directly opposite the axial collar 45 of the shroud 46. The downstream abradable member 44 is mounted with an axial clearance in relation to the axial collar 45. The axial collar 45 of the shroud 46 will be in axial contact with the downstream abradable member 44 when the turbomachine is in cruising phase, so as to stop the gas flow entering the cavity 26. The axial contact is ensured via the relative axial displacements between the mobile wheels 4, 5 and the bladed turbine stator 6, when the turbomachine is in operation.

The sealing performed via the axial collar 45 and the downstream abradable member 44 is here in addition to the sealing performed via the upstream and downstream sealing elements 10, 11.

Alternatively, the downstream abradable member could be adapted to cooperate with upstream spoilers of the inner platforms of the mobile vanes of the downstream mobile wheel.

According to an embodiment not shown, the assembly illustrated in FIG. 5 (third embodiment) could comprise an upstream abradable member 42 and/or a downstream abradable member 44, in the same manner as the first and second embodiments.

The invention claimed is:

1. An assembly for a turbomachine comprising a first mobile wheel extending around an axis and an adjacent bladed turbine stator, said bladed turbine stator being coaxial with said axis and axially offset from said first mobile wheel, said assembly comprising a plurality of sealing elements, each sealing element being secured to said first mobile wheel and projecting radially from said first mobile wheel, said bladed turbine stator comprising an inner platform intended to delimit a gas flow channel in the turbomachine and a root extending radially below the inner platform, said root bearing at a radially inner end at least one abradable element configured to cooperate with the sealing elements, characterised in that the sealing elements are placed in an enclosure formed by said at least one abradable element, said enclosure being open inwards and delimited axially by an upstream abradable edge and a downstream abradable edge, said enclosure being radially delimited by an outer abradable edge, and in that at least one of the sealing elements comprises a first lip configured to cooperate with the upstream abradable edge or the downstream abradable edge, and a second lip separate from the first lip and configured to cooperate with the outer abradable edge.

2. The assembly according to claim 1, wherein the at least one sealing element comprises an upstream sealing element, the first lip comprising an axial lip extending upstream, said axial lip of said upstream sealing element being configured to cooperate with said upstream abradable edge.

3. The assembly according to claim 1, wherein the at least one sealing element comprises a downstream sealing element, the first lip comprising an axial lip extending downstream, said axial lip of said downstream sealing element being configured to cooperate with said downstream abradable edge.

4. The assembly according to claim 1, wherein each of the sealing elements comprises a respective second lip comprising a radial lip extending outwardly, each of the radial lips being configured to cooperate with the outer abradable edge of the enclosure formed by the at least one abradable element.

5. The assembly according to claim 1, wherein the plurality of sealing elements comprises an upstream sealing element and a downstream sealing element, wherein the at least one abradable element is radially staged and comprises a first cylindrical surface surrounding the upstream sealing element and a second cylindrical surface surrounding the downstream sealing element.

6. The assembly according to claim 5, wherein said first cylindrical surface has a larger diameter than said second cylindrical surface.

7. The assembly according to claim 1, wherein said first mobile wheel comprises a disc to which mobile vanes are fitted, said disc comprising a flange extending axially, said sealing elements being fitted to said flange or integrally formed with said flange.

8. The assembly according to claim 1, wherein said assembly comprises a second mobile wheel adjacent to said bladed turbine stator so that said bladed turbine stator is axially arranged between said first mobile wheel and said second mobile wheel, said assembly comprising a shroud flanged between said first mobile wheel and said second mobile wheel, the sealing elements being fitted to said shroud or integrally formed with said shroud.

9. The assembly according to claim 1, wherein said upstream and downstream abradable edges of the enclosure formed by the at least one abradable element are fitted to said root of said inner platform.

10. The assembly according to claim 1, wherein a first abradable element comprises said upstream abradable edge and a second abradable element comprises said downstream abradable edge.

11. The assembly according to claim 1, wherein the root comprises an upstream abradable member arranged axially upstream of the root, said upstream abradable member being adapted to cooperate with a spoiler of a mobile vane of the first mobile wheel.

12. The assembly according to claim 1, wherein the root comprises a downstream abradable member arranged axially downstream of the root, said downstream abradable member being adapted to cooperate with a spoiler of a shroud flanged between said first mobile wheel and a second mobile wheel adjacent to said bladed turbine stator.

13. A turbomachine comprising a turbine comprising an assembly according to claim 1.

* * * * *